(12) United States Patent
Kirane et al.

(10) Patent No.: US 10,982,536 B2
(45) Date of Patent: Apr. 20, 2021

(54) PERFORMING A WELL OPERATION BASED UPON A MINIMUM IN-SITU STRESS DETERMINATION

(71) Applicants: Kedar S. Kirane, Smithtown, NY (US); Shekhar V. Gosavi, Spring, TX (US); Pablo F. Sanz Rehermann, Midland, TX (US)

(72) Inventors: Kedar S. Kirane, Smithtown, NY (US); Shekhar V. Gosavi, Spring, TX (US); Pablo F. Sanz Rehermann, Midland, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 31 days.

(21) Appl. No.: 16/384,562

(22) Filed: Apr. 15, 2019

(65) Prior Publication Data

US 2019/0338638 A1 Nov. 7, 2019

Related U.S. Application Data

(60) Provisional application No. 62/666,753, filed on May 4, 2018.

(51) Int. Cl.

| | | |
|---|---|---|
| *E21B 49/00* | (2006.01) | |
| *E21B 47/06* | (2012.01) | |
| *E21B 41/00* | (2006.01) | |
| *E21B 43/26* | (2006.01) | |
| *G01V 9/00* | (2006.01) | |

(52) U.S. Cl.
CPC ........ *E21B 49/008* (2013.01); *E21B 41/0092* (2013.01); *E21B 43/26* (2013.01); *E21B 47/06* (2013.01); *E21B 49/006* (2013.01); *G01V 9/00* (2013.01); *E21B 2200/20* (2020.05)

(58) Field of Classification Search
CPC ...... E21B 49/006; E21B 49/008; E21B 47/06; E21B 2200/20
See application file for complete search history.

(56) References Cited

U.S. PATENT DOCUMENTS

| | | | |
|---|---|---|---|
| 6,860,147 B2 * | 3/2005 | Gunter | E21B 41/0064 166/263 |
| 9,303,508 B2 * | 4/2016 | Ramakrishnan | E21B 33/124 |
| 9,390,204 B2 * | 7/2016 | Bowen | E21B 43/26 |
| 2016/0003020 A1 * | 1/2016 | Sharma | E21B 47/06 166/250.1 |
| 2016/0186532 A1 | 6/2016 | Wang et al. | |

OTHER PUBLICATIONS

Schlumberger Oilfield Glossary—fall off test (Year: 2020).*
Bear, J., "Dynamics of Fluids in Porous Media", 1988, pp. 119-125, Dover Publications, Inc., New York.
Detourany, E. et al., "Fundamentals of Poroelasticity," Comprehensive Rock Engineering: Principles and Projects, 1993, 96 pages, vol. II, C. Fairhurst, Pergamon Press.
Kirane, K. et al., "Numerical Modeling of the Step Rate Test Using Fully Coupled Hydraulic Fracturing Capabilities," American Rock Mechanics Association, 2017, 8 pages, ARMA 17-913, San Francisco, CA.
Searles, K. et al., "Fully-Coupled 3D Hydraulic Fracture Models: Development, Validation, and Application to O&G Problems," Society of Petroleum Engineers, 2016, 20 pages, SPE-179121-MS, The Woodlands, Texas.
Terzaghi, K., "Theoretical Soil Mechanics," 1943, pp. 11-15, John Wiley & Sons, Inc., New York.
Terzaghi, K. et al, "Soil Mechanics in Engineering Practice," 1996, pp. 83-97, Third Edition, John Wiley & Sons, Inc., New York.
Zoback, M., Reservoir Geomechanics, 2007, pp. 14-16, 206-219, 280-287, Cambridge University Press, United Kingdom.

* cited by examiner

*Primary Examiner* — Catherine Loikith

(57) ABSTRACT

A system of performing a well operation including determining a minimum horizontal in-situ stress of a subterranean formation, comprising: a first component configured to create a measured pressure response from data of a well injection test; a simulation component configured to generate a simulated pressure response with a selected value of a simulated minimum horizontal in-situ stress; and an arrangement to compare at least a portion of the simulated pressure response to a corresponding portion of the measured pressure response to resolve a difference; whereby the minimum horizontal in-situ stress of the formation may be equated to a value of the simulated minimum horizontal in-situ stress corresponding with a lesser resolved difference. Further aspects of the disclosure include novel methods.

10 Claims, 3 Drawing Sheets

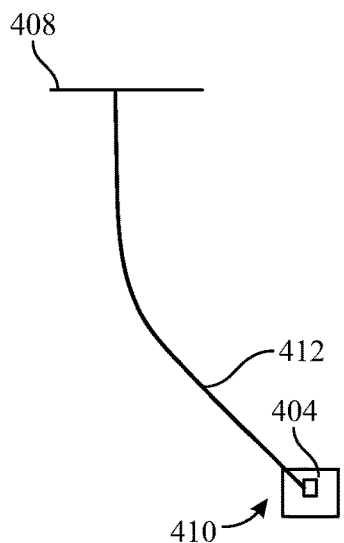
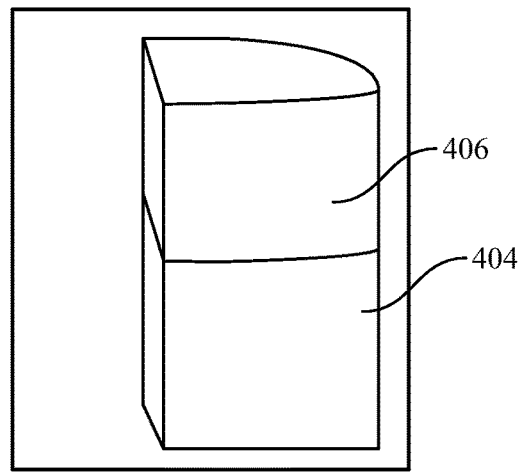
FIG. 4A
FIG. 4B
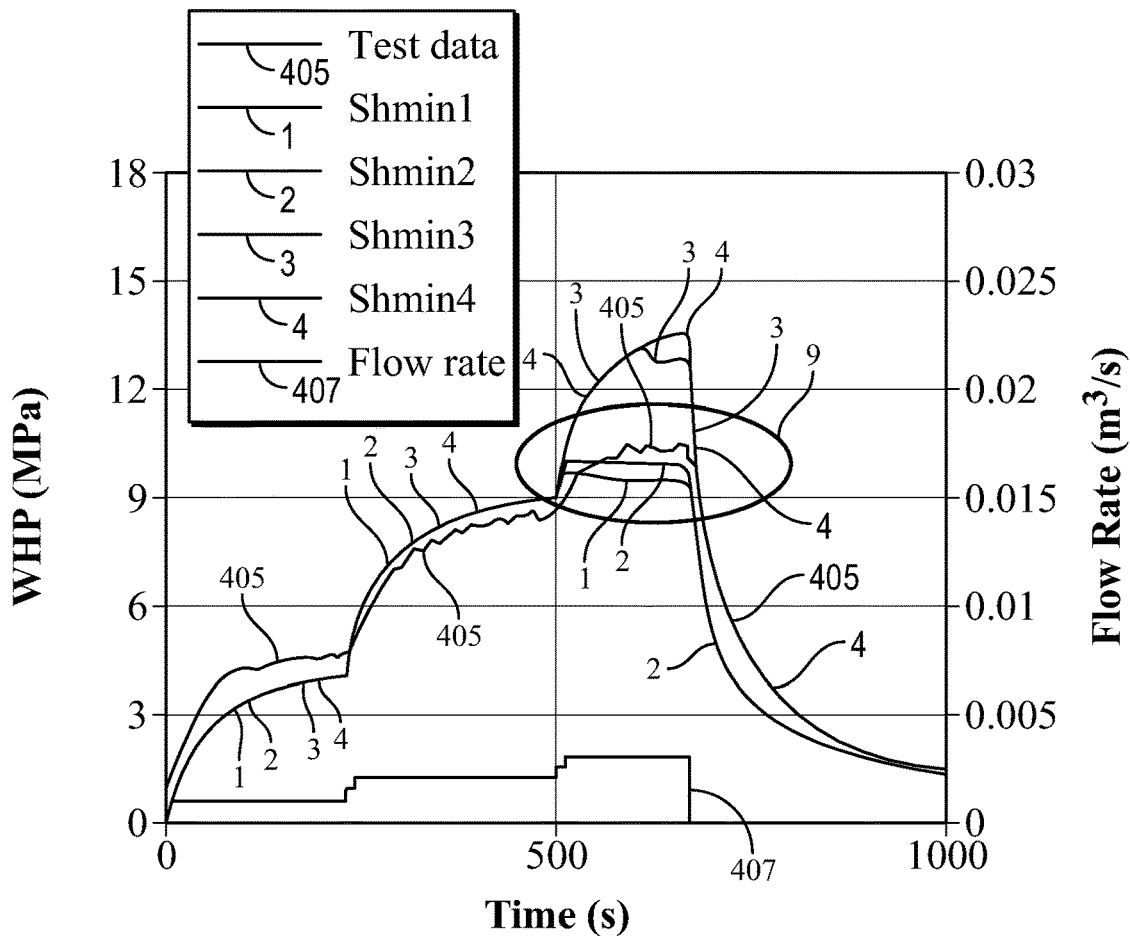
FIG. 5

PERFORMING A WELL OPERATION BASED UPON A MINIMUM IN-SITU STRESS DETERMINATION

CROSS-REFERENCE TO RELATED APPLICATION

This application claims the benefit of U.S. Provisional Patent Application 62/666,753 filed May 4, 2018, the entirety of which is incorporated by reference herein.

FIELD

The present disclosure relates to systems and methods of determining an in-situ stress of a subterranean formation, and more particularly, methods of determining a minimum horizontal in-situ stress of a subterranean formation based upon data from a well injection test.

ENVIRONMENT

In conventional hydraulic fracturing as practiced by industry, the direction of fracture propagation is primarily controlled by the orientation of the subsurface ("in-situ") stresses. The three principal stresses are assumed to be one in a vertical direction and two in horizontal directions, all mutually perpendicular to one other. The two horizontal stresses are usually resolved into a maximum in-situ horizontal stress and a minimum in-situ horizontal stress. The two stresses may be mutually perpendicular (in a horizontal plane) and are assumed to be acting uniformly on a subsurface formation. The direction that a hydraulic fracture will propagate from a wellbore into a subterranean formation is usually perpendicular to the least principal in-situ stress.

A prior practice to characterize the minimum horizontal in-situ stress $S_{hmin}$ of a subterranean formation has included constructing a pressure fall-off analysis (PFA) from well injection test data, wherein a pressure fall-off curve is manipulated to reveal the fracture closure pressure $P_c$ which is then equated to an estimated value for $S_{hmin}$. However these estimates are not always accurate, and consequently can hamper the robustness of a design of an injection system and execution of hydraulic fracture treatments.

Determination of the fracture closure pressure $P_c$ from pressure fall-off analysis (PFA) of well injection test data is not always effective and reliable, which contributes further uncertainty to the estimation of a value for $S_{hmin}$. Some of the reasons include:

in unconventional applications due to the low permeability of shale, the pressure fall-off and fracture closure can take a very long time, adding cost and delay to the drilling operation. To circumvent the time requirement, sometimes the instantaneous shut-in pressure (ISIP) is used as an approximation of $S_{hmin}$, which practice can be inaccurate;

if the pump shut-in is not truly instantaneous, the associated pressure fall-off is due to both fluid dissipation in the formation and a decreasing injection rate. Such a confounded fall-off curve cannot yield a correct value for $S_{hmin}$;

if the pumped fluid volume is low, or if the rock permeability is high, then the resulting fracture could be very small and lie entirely within the region of stress concentration near the wellbore. Consequently, the fracture may close against a higher level of stress, making the closure pressure greater than the true $S_{hmin}$ by an unknown amount.

Accordingly, an unmet need has persisted for a reliable method to obtain a determination of $S_{hmin}$ from data collected from well injection tests.

SUMMARY

An aspect of the present disclosure provides a method of executing an operation regarding a subterranean formation comprising determining an in-situ stress of a subterranean formation by determining a measured pressure response from data collected from a well injection test conducted upon a subterranean formation, generating a simulated pressure response by running a simulation of the well injection test with a selected value of simulated in-situ stress, and comparing at least a portion of the simulated pressure response to a corresponding portion of the measured pressure response to resolve a difference, and identifying which of a multiple of selected values of simulated in-situ stress generates a lesser resolved difference and equating the in-situ stress of the subterranean formation to the identified value of simulated in-situ stress of the lesser difference; and utilizing the identified selected value as the in-situ stress in executing an operation regarding the subterranean formation.

In some embodiments, the in-situ stress may comprise a minimum horizontal in-situ stress and/or the executing an operation may comprise at least one of a selection of treatment fluid pressure, selection of pump equipment and developing drill plans for other wells.

In still other embodiments, the resolving may comprise, if the compared portion of the simulated pressure response may be less than the corresponding portion of the measured pressure response, selecting a higher value of simulated in-situ stress and repeating the running, the comparing and the identifying, and, if the compared portion of the simulated pressure response is greater than the corresponding portion of the measured pressure response, selecting a lower value of simulated in-situ stress and repeating the running, the comparing and the identifying.

The generating may include running the simulation of the well injection test with a multiple of different selected values of a simulated minimum horizontal in-situ stress and/or the comparing may include comparing the portions of the simulated pressure response and the measured pressure response which relate to at least one of fracture initiation and fracture propagation, respectively.

In still other embodiments, the simulation may be configured with a capacity to model: (i) porous medium deformation; (ii) pore fluid flow; (iii) fracturing fluid flow; and/or (iv) fracture propagation.

In other embodiments, the simulation may comprises at least one of the following: a model of flow along a porous media according to Darcy's law; a model of hydraulic fracture initiation wherein coincident faces separate under a traction load; a model of fracturing fluid flow including longitudinal fluid flow according to Reynold's lubrication theory and Poiseuille flow; and/or a model of leak off flows in which a transition from Darcy flow in an undamaged state to Pouseuille flow in a damaged state varies with a parameter D having a value which ranges from 0 to 1.

The method may further comprise a simulation of a wellbore comprising a plurality one-dimensional 2-node pipe elements.

Another aspect of the present disclosure provides a method of executing an operation regarding a subterranean formation, comprising determining an in-situ minimum horizontal stress of a subterranean formation by resolving a measured fracture propagation pressure from data of a well injection test conducted in a subterranean formation, generating a simulated fracture propagation pressure by running a simulation of the well injection test with a selected value for a simulated minimum horizontal in-situ stress, comparing the generated simulated fracture propagation pressure to the measured fracture propagation pressure, if different, changing the selected value for a simulated in-situ minimum horizontal stress to a more convergent value and repeating the generating and comparing; and approximating the minimum horizontal in-situ stress of the subterranean formation as being the more convergent value; and utilizing the approximated minimal horizontal in-situ stress in executing an operation regarding the subterranean formation.

In some embodiments, the executing an operation may comprise at least one of a selection of treatment fluid pressure, selection of pump equipment and developing drill plans for other wells.

The method may further comprise resolving a measured pressure fall-off segment comprising a measured instantaneous shut-in pressure and a measured fracture closure pressure from data of a well injection test conducted in a formation, including with the simulation of the well injection test a model of the measured pressure fall-off segment, together with conducting a further well injection test to resolve a second measured instantaneous shut-in pressure and running the model with the second measured instantaneous shut-in pressure to resolve a derived value for fracture closure pressure, and equating a minimum horizontal in-situ stress of the formation to the derived value for fracture closure pressure.

Yet another aspect of the present disclosure provides a system operable to determine a minimum horizontal in-situ stress of a subterranean formation, comprising: a test result component from a well injection test conducted in a subterranean formation, the test result component including pressure-fall off data and being sufficient to resolve a measured pressure response, a simulation component configured to generate a simulated pressure response, the simulation component operable to execute a simulation of the well injection test with a selected value of a simulated minimum horizontal in-situ stress, an arrangement to compare at least a portion of the simulated pressure response to a corresponding portion of the measured pressure response to resolve a difference, whereby the minimum horizontal in-situ stress of the subterranean formation may be equated to a value of the simulated minimum horizontal in-situ stress corresponding with a lesser resolved difference.

In some embodiments, the system may further comprise an analytical model for interpretation of pressure-fall off data of the well injection test to obtain at least one of the selected value of a simulated minimum horizontal in-situ stress. The simulation component may be configured with a capacity to model: (i) porous medium deformation; (ii) pore fluid flow; (iii) fracturing fluid flow; and/or (iv) fracture propagation and/or at least one of the following: a model of flow along a porous media according to Darcy's law; a model of hydraulic fracture initiation wherein coincident faces separate under a traction load; a model of fracturing fluid flow including longitudinal fluid flow according to Reynold's lubrication theory and Poiseuille flow; and/or a model of leak off flows in which a transition from Darcy flow in an undamaged state to Pouseuille flow in a damaged state varies with a parameter D having a value which extends from 0 to 1. The simulation component may further comprise a simulation of a wellbore comprising a plurality one-dimensional 2-node pipe elements.

BRIEF DESCRIPTION OF THE DRAWINGS

While the present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein. This disclosure is to cover all modifications and equivalents as defined by the appended claims. It should also be understood that the drawings are not necessarily to scale, emphasis instead being placed upon clearly illustrating principles of exemplary embodiments of the present disclosure. Moreover, certain dimensions may be exaggerated to help visually convey such principles. Further where considered appropriate, reference numerals may be repeated among the drawings to indicate corresponding or analogous elements. The following drawings are provided, wherein:

FIG. 4a is a representation of a finite element model of a simulated well and formation of the example model simulation, according to an embodiment;

FIG. 4b is an enlarged view of the example model simulation of the representation of FIG. 4a;

FIG. 5 is a graphical representation comparing a measured pressure response of a well test to predicted pressure responses calculated from a selected multiple of values for $S_{hmin}$ using the example model simulation, according to an embodiment.

DETAILED DESCRIPTION

An aspect of the present disclosure provides an improved method for performance of a well work operation, such as drilling a wellbore, stimulating a formation, injecting fluids into a formation, based upon using a reliable estimate of minimum horizontal in-situ stress ("$S_{hmin}$") from a well injection test, with the aid of a numerical simulation that closely simulates the physics of a pressure response that may occur during such tests, including a simulation of hydraulic breakdown, fracture initiation and fracture propagation, coupled with a resolution of how outputs of pressure response from the numerical simulation may be brought into convergence with a corresponding, measured pressure response from the well injection test by running multiple values for $S_{hmin}$. In some embodiments, the convergence (matching) is undertaken with respect to the fracture propagation pressure, but in other embodiments, may be undertaken with respect to the fracture initiation pressure. Candidate values for $S_{hmin}$ for running through the numerical simulation may be obtained by using one or more analytical models for pressure fall-off analyses, including by way of non-limiting example, data diagnostic analyses (analytical models) such as square-root time analysis and G-function analysis. If a candidate value for $S_{hmin}$, when run through the numerical simulation, produces a simulated (fracture propagation) pressure that is different from the measured (fracture propagation) pressure, then that candidate value may be adjusted until the simulated and measured pressures converge. In essence, the well injection test is simulated and the simulation is run with multiple values of $S_{hmin}$ and the value of $S_{hmin}$ for which the predicted (simulated) fracture initiation, breakdown and/or fracture propagation pressure from the simulation agrees with the measured one (from the actual well injection test) is resolved as the $S_{hmin}$ of the subterranean formation. The methods and systems disclosed herein may proceed by matching the simulated and measured fraction propagation pressures, although the other two (the fracture initiation pressures and the breakdown pressures) may be matched in lieu of or in addition to the matching of the fracture propagation pressures.

Figure 1:
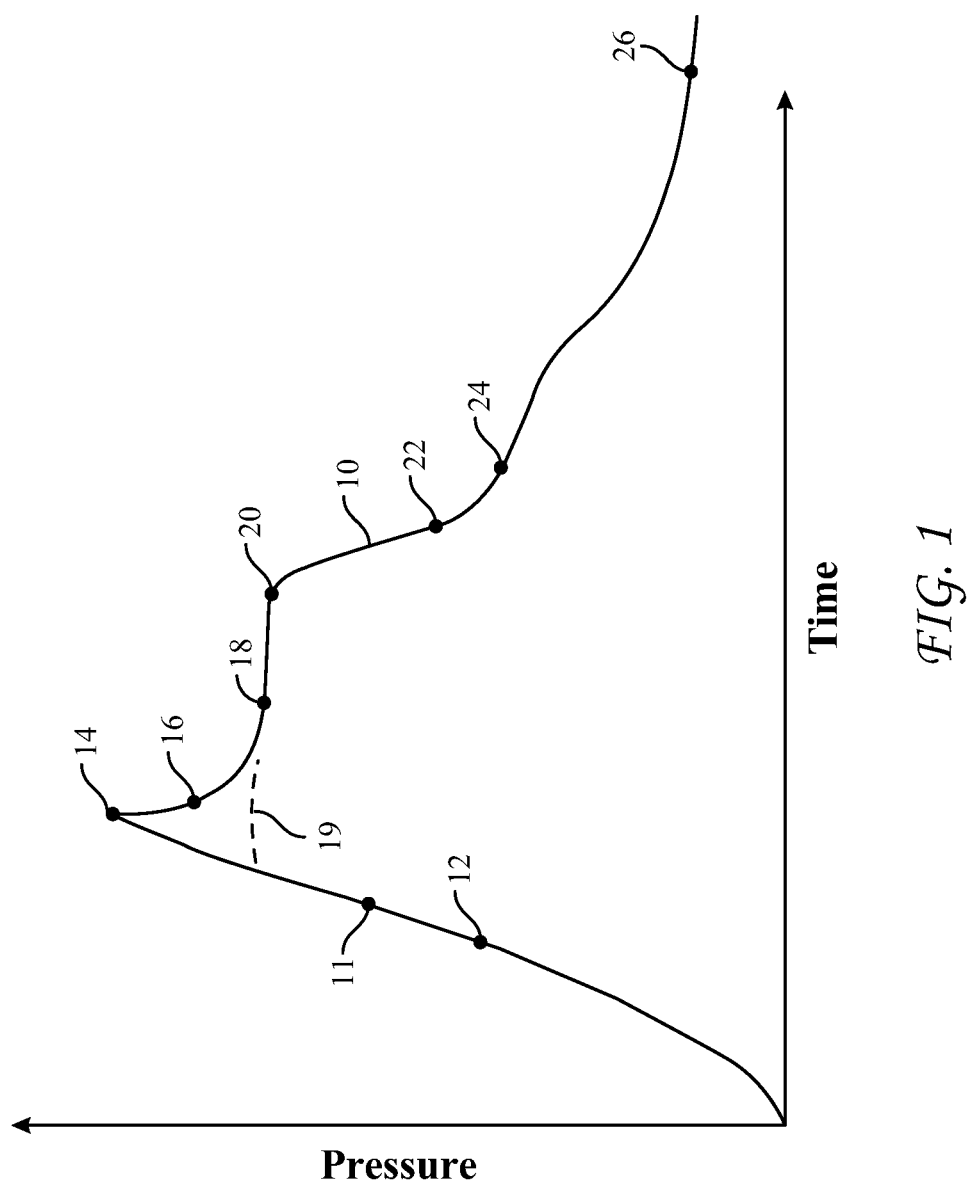
FIG. 1 is a graphical representation of pressures observed over time during an example test fracturing operation.

Referring now to FIG. 1, therein is depicted an exemplary curve 10 of pressure behavior during a representative test fracturing procedure. During the procedure, pressure will be applied in the wellbore during the test. As can be seen from curve 10, pressure may increase during a pressurization 12 beyond a fracture initiation pressure 11 until the time when a breakdown pressure 14 is achieved and a fracture is opened. Following the breakdown pressure 14, there is a relief in pressure 16 representing an abrupt drop in pressure from the breakdown pressure 14 to a fracture propagation pressure 18, the latter which may be somewhat steady. In some tests and/or when the fracture has already been initiated, the breakdown pressure 14 may comprise an abrupt cessation of increased pressurization 19 followed almost immediately by a somewhat steady level of pressure associated with fracture propagation pressure. The fraction propagation pressure 18 will be controlled primarily by the minimum horizontal stress in the stress field (subterranean formation). When the well is shut-in 20, there usually will be another abrupt pressure decline yielding the instantaneous shut-in pressure 22 followed by a period of relatively gradual pressure decline until a (fracture) closure pressure 24 is reached. The instantaneous shut-in pressure 22 may be measured at a predetermined time after a shut-in 20, such as 10 seconds, for example. The time between the instantaneous shut-in pressure 22 and the closure pressure 24 may extend for hours or days, especially in formations of low permeability such as shale. After closure, fluid will gradually leak-off into the subterranean formation over time until the monitored pressure may equal the reservoir pressure 26.

In an example embodiment, the simulation may include a modeling framework suitable for the purposes disclosed herein, which may be a fully coupled 3D poromechanics based formulation, implemented in Abaqus, a commercial finite element software, such as described in Searles K. H., M. G. Zielonka, J. Ning, J. L. Garzon, N. M. Kostov, P. F. Sanz and E. Biediger, 2016; Fully-Coupled 3D Hydraulic Fracture Models: Development, Validation, and Application to O&G Problems. *In Society of Petroleum Engineers (SPE)* doi: 10.2118/179121-MS, which is incorporated herein by reference in its entirety for all purposes to be served herein).

The model of the example simulation may be configured to account for an interaction between four different physical phenomena, including (i) porous medium deformation, (ii) pore fluid flow, (iii) fracturing fluid flow, and (iv) fracture propagation.

In the model of the example simulation, a porous media, i.e., the rock, may be modeled as an isotropic, poro-elastic material. The small strain constitutive relation may be described in terms of the Terzaghi effective stress $\sigma_{ij}'=\sigma_{ij}+p\delta_{ij}$, with p being the pore pressure and $\delta_{ij}$ the Kronecker delta. (See Terzaghi, K., 1943, "Theoretical Soil Mechanics", Wiley, New York; and Terzaghi, K., Peck, R. B., Mesri, G., 1996, "Soil Mechanics in Engineering Practice", John Wiley & Sons, Inc., ISBN 0-471-08658-4, which are incorporated herein by reference in their entireties for all purposes to be served herein).

The pore fluid flow component of the model of the example simulation may be governed by the relevant continuity equation where the pore fluid seepage velocity v is related to the pressure gradient according to Darcy's law, as $v_i = -(k/\mu)p_{,i}$; where k is the permeability, $\mu$ is the pore fluid viscosity and the subscript ",i" denotes the spatial derivative with respect to the coordinate i=1, 2, 3. (See Detournay, E. and A. H.-D. Cheng, 1993, Fundamentals of Poroelasticity, Chapter 5 in Comprehensive Rock Engineering: Principles, Practice and Projects, Vol. II, Analysis and Design Method, ed. C. Fairhurst, Pergamon Press, 113-171; see also, Bear, J. 1988, Dynamics of Fluids in Porous Media, Am. Dover Publications, Mineola, N.Y. ISBN 0486656756, which are incorporated herein by reference in their entireties for all purposes to be served herein).

Figure 2:
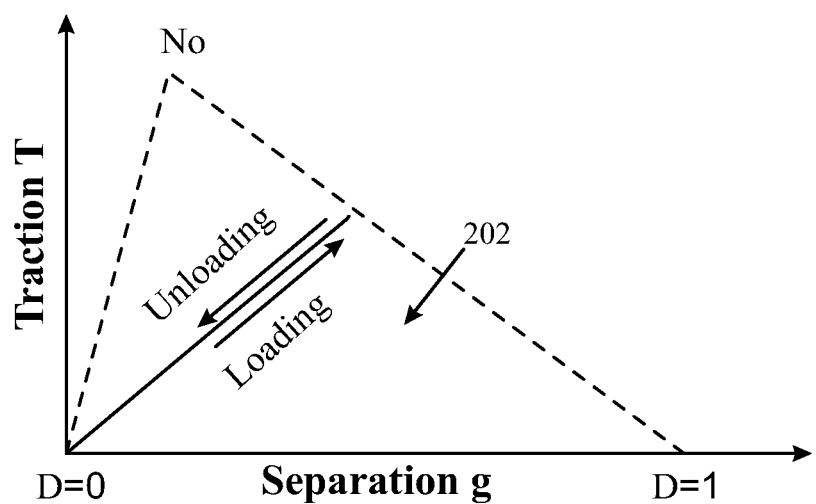
FIG. 2 is a graphical representation of relationships governing traction separation of cohesive elements as used in the example model simulation, according to an embodiment.
Figure 3:
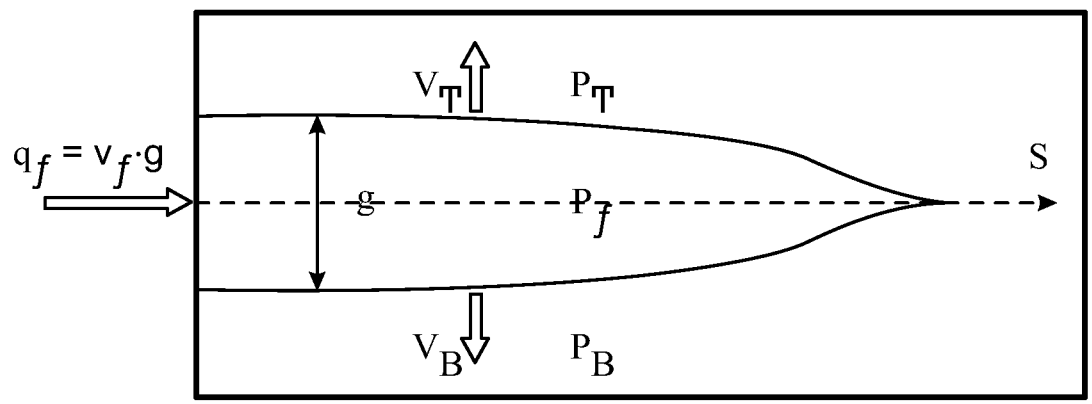
FIG. 3 is a graphical representation of relationships governing fluid flow in a fracture as used in the example model simulation, according to an embodiment.

The hydraulic fracture component of the model in the example simulation may be modeled using specialized cohesive zone elements which may have both displacement and pore pressure degrees of freedom. The cohesive zone element, which is based on the theory of fracture mechanics, may have a zero physical thickness, and may comprise two initially coincident faces, which can separate under a traction load (see Abaqus® user's manual, version 6.16, Dassault Systemes Simulia Corp., Providence R.I. 2016, which is incorporated herein by reference in its entirety for all purposes to be served herein). The separation between the two faces may be resisted by the traction which may decay gradually as the separation increases. The damage may be assumed to initiate when the effective stress reaches the material tensile strength, which may be governed by the parameter $N_0$ as shown in FIG. 2. The area 202 (the area beneath both dotted lines in FIG. 2) under the softening part of the traction separation curve corresponds with the fracture energy $G_c$ of the material (rock). When the fracture is fully open, the longitudinal fluid flow within the fracture may be governed by Reynold's lubrication theory which is defined by, $$\dot{g} + \frac{\partial q_f}{\partial s} + v_L = 0 \quad (1)$$

where g is the fracture gap or opening (normal to the faces), $q_f$ is the fracturing fluid flow per unit width across the fracture, s is the co-ordinate along the length of the fracture and $v_L$ is the fluid leak-off velocity, which consists of two parts, one for each face of the fracture (see FIG. 3). The momentum equation for incompressible flow and Newtonian fluids through narrow parallel plates (i.e., Poiseuille flow) is given by:

$$q_f = -\frac{g^3}{12\mu_f} \frac{\partial p_f}{\partial s} \quad (2)$$

Further in regard to the hydraulic fracture component of the example model embodiment, the fluid leak off velocity may be computed as:

$$v_T = c_T(p_f - p_T); \; v_B = c_B(p_f - p_B); \; v_L = v_T + v_B \quad (3)$$

where $p_T$ and $p_B$ are the pore fluid pressures on the top and bottom faces of the fracture, $p_f$ is the pressure inside the fracture, and $c_T$ and $c_B$ are the corresponding leak-off coefficients.

The leak-off component of the model of the example simulation essentially may simulate a layer of filter cake that may accumulate on the fracture faces, which acts as additional resistance to fluid flow into the formation. A damage dependent flow transition routine may be formulated in these elements, which may model a smooth transition from Darcy flow in an undamaged state to Poiseuille flow in a fully damaged state (see U.S. Published Patent Application No. 2016/0186532 to Wang et al., which is incorporated herein by reference in its entirety for all purposes to be served herein).

During aforementioned transition, the flow contributions from each mode may be weighted according a level of damage in that element as may be determined by a variable D whose value may range from 0 to 1 as the element goes from the undamaged state to the fully damaged state. The formulation also ensures that upon fracture closing, the flow returns to the Darcy flow. This aspect helps correctly portray/model a pressure response during fracture initiation.

The model of the example simulation may further include a component to simulate a fluid flow in the wellbore, and may use a specialized one-dimensional 2-noded pipe element which may be based on the Bernoulli's equation. In various embodiments, if nodes 1 and 2 may represent one pipe element, then the following relationship may be the governing equation for the pipe:

$$\frac{P_1}{\rho g} + \frac{V_1^2}{2g} + Z_1 = \frac{P_2}{\rho g} + \frac{V_2^2}{2g} + Z_2 + C_L \frac{V_a^m}{2g} \quad (4)$$

where P is the fluid pressure, V is the fluid velocity, Z is the elevation, $\rho$ is the fluid density, g is the acceleration due to gravity and $C_L$ is the friction coefficient given as $C_L=fl/d$, f being the friction factor which may be calculated according to the Reynolds number in the element and l and d, are the length and hydraulic diameter of that pipe element. The suffixes 1 and 2 denote the node ID and the suffix 'a' denotes the average. The exponent m=2 for Darcy-Weisbach flow loss. The pipe element nodes may only have fluid pressure degrees of freedom, and injection from the wellbore into the formation may be simulated using a "tie" constraint between the relevant nodes of the pipe element and the formation and the cohesive element. Additional frictional losses which are proportional to the square of the flow velocity can be specified in these elements.

The above described hydraulic fracture (HF) example model thus has a capacity to account for the physics governing the hydraulic fracture initiation and propagation, including any near wellbore stress concentration for any given well orientation. It can accurately predict the pressure response before, during and after fracture initiation, and can therefore predict correctly the mentioned relief pressure at which fracture initiation and propagation begins. It also can accurately pressure response from an entire well injection test, as shown in previously published studies (see Zielonka M. G., K. H. Searles, J. Ning and S. B. Buechler, 2014. Development and Validation of Fully-Coupled Hydraulic Fracturing Simulation Capabilities, *Simulia Community Conference*, Providence R.I.; Ning J., G. Kao, N. M. Kostov, K. H. Searles, S. B. Buechler and P. F. Sanz, 2015; Experimental Validation of Simulation Capabilities for Hydraulic Fractures Propagating in a Porous Medium. *Simulia Community Conference*, Providence R.I.; Kirane K., Gosavi S., Ning J. and Sanz P. F., 2017, Numerical Modeling of the Step Rate Test Using Fully Coupled Hydraulic Fracturing Capabilities, The 51st US Symposium on Rock Mechanics, American Rock Mechanics Association, San Francisco Calif., all which are incorporated herein by reference in their entireties for all purposes to be served herein).

Referring now to FIG. 4a and FIG. 4b, to simulate this test using aspects of the present teachings, a 3D finite element model simulation with a simple 2 layer geometry was constructed in Abaqus. One layer 404 was corresponded to the low permeability shale while the other to the moderate permeability sand 406. The size of the entire model domain was 50×50×100 meter. Given the small injected volume, this was deemed sufficient.

Exploiting the symmetry of the problem, only a quarter of the geometry was considered. The C3D8P elements of Abaqus were used to simulate the simulated shale formation 404. The mesh around the wellbore was refined to properly capture the near wellbore stress concentration and the pore pressure gradients occurring during injection. Cohesive elements (with both displacement and pore pressure degrees of freedom, and flow transition behavior) were laid along a plane perpendicular to the minimum horizontal stress, starting from the wellbore location. The material properties of the shale formation 404 (e.g., elastic modulus, Poisson's ratio, fracture toughness) were obtained from the relevant well logs. The wellbore flow was modeled via a series of the aforementioned 1D pipe elements 412 extending from the surface 408 to the bottom hole 410. To simulate injection, the node of the pipe element lying at the perforation depth was 'tied' to the nodes of the formation elements and the cohesive elements coinciding with the perforation zone depth range. The 'tie' essentially represents a constraint equation for the pore pressure degree of freedom at the relevant nodes. The flow rate history was specified (and entered into the example model) at the surface, and the pressure response of the formation was generated/predicted. To compare with the measured pressure data which was at the surface, the fluid pressure at the pipe element node position at the surface 408 was extracted from the modeling results. This was a direct output from the model owing to the pipe elements, which are configured to readily account for the friction losses and hydrostatic head.

Referring now to FIG. 5, test data from an actual test included measured values of well-head pressure (MPa), which is represented over time by the line designated 405 and measured values of flow rate (m$_3$/sec), which is represented over time by the line designated 407. The encircled region 9 corresponds to an occurrence of pressure relief in the test data (i.e., fracture initiation and propagation). The actual pressure test was modeled (simulated), and multiple values of (selected, simulated) minimum horizontal in situ stress ($S_{hmin}$) were run through the model of the example simulation. The multiple values of $S_{hmin}$ included 26.92 MPa (3904 psi, compressive) and other values that were greater and lesser than 26.92 MPa. These multiple values may be selected based on pressure fall-off analyses of the actual tests using different data diagnostic analyses like square-root time analysis and G-function analysis. The value of $S_{hmin}$ that yielded a pressure response agreeing (converging) with the measured pressure response 405 of the actual test at the region 9 (of fracture initiation and propagation pressures) is the curve which is designated 2 (the line for Shmin 2 in FIG. 5), at which $S_{hmin}$=26.92 MPa (3904 psi, compressive). For lower values of $S_{hmin}$ (such as the line designated 1 in FIG. 5, wherein the selected $S_{hmin}$ value was set below 26.92 MPa) the pressure response of the model under-predicted relative to the test data 405 at the encircled region 9, while for higher values (such as the curves designated 3 and 4 in FIG. 5, wherein the $S_{hmin}$ values were set above 26.92 MPa), the pressure responses of the model over-predicted the test data 405, especially in the encircled region 9. For this test, fairly reliable pressure fall-off data was available, with a hard shut-in, and sufficiently pumped fluid volume. Pressure fall-off analysis of the test data, using the G-function analysis yielded a minimum horizontal stress as 27.1 MPa (3930 psi, compressive), which agrees with the modeling prediction as resolved using the disclosed method of the example simulation. Also it should be noted that for this actual test, the ISIP was 4450 psi which is higher by approximately 500 psi compared to the $S_{hmin}$ that was predicted by the disclosed method The aforementioned also shows that ISIP as an estimate of $S_{hmin}$ can be fairly inaccurate.

This technique can be used to reliably determine in-situ stresses for conventional and unconventional applications, using well injection test data from a well of any inclination. The model of the example simulation may also be used to conduct a systematic sensitivity study, spanning conceivable ranges of various essential physical parameters.

It is noteworthy that the disclosed method provides a reliable estimate of the minimum horizontal stress from a well injection test, and eliminates sole reliance on pressure fall-off analysis which can have ambiguity. The disclosed method improves the reliability of the $S_{hmin}$ estimate and therefore has important implications on the robustness of the design of the injection systems and their hydraulic fracture treatments. For example, operating pressures can be set with more certainty, such as in treatments of a formation to be undertaken at pressures above the minimum horizontal in situ stress to promote injection of a treatment fluid or below the minimum horizontal in situ stress to limit injection of the treatment fluid. Likewise, the selection of pumps and other components can be selected with more certainty. It can also be useful in developing the drilling plans for other wells in the vicinity.

Alternatively or in addition, the first and/or some additional actual pressure fall-off tests may be conducted long enough to provide readings of actual ISIP of the respective well and its actual fracture closure pressure, and the simulation model may be configured and calibrated to reproduce those readings, in the form of a simulated ISIP (which may be correlated with the actual ISIP) and a simulated fracture closure pressure, which may be correlated with the actual fracture closure pressure. In addition, a relationship may be established between simulated fracture closure pressure and the simulated ISIP of the model (and/or the actual ISIP reading of the respective pressure fall-off test). Thereafter, with a relationship between ISIP and the fracture closure pressure having been established with the model, the operator, when drilling a further well at our about the same subterranean formation, may conduct a pressure fall-off test of sufficient time to establish a reading (determination) of actual ISIP and may use the model to resolve a derived fracture closure pressure for the well, without having to continue the pressure fall-off test for the additional, prolonged period of time necessary to determine the actual fracture closure pressure. The derived fracture closure pressure may then be equated to the minimum horizontal in situ stress of the formation at the new well.

While aspects of the present disclosure may be susceptible to various modifications and alternative forms, the exemplary embodiments discussed above have been shown by way of example. It should again be understood that the disclosure is not intended to be limited to the particular embodiments disclosed herein. Indeed, the present disclosure includes all modifications, equivalents, and alternatives falling within the spirit and scope of the appended claims.

What is claimed is:

1. A method of executing an operation regarding a subterranean formation, comprising: determining an in-situ stress of a subterranean formation, comprising:
    determining a measured pressure response from data collected from a well injection test conducted upon a subterranean formation;
    generating a simulated pressure response by running a simulation of the well injection test with a selected value of simulated in-situ stress;
    comparing at least a portion of the simulated pressure response to a corresponding portion of the measured pressure response to resolve a difference;
    identifying which of a multiple of selected values of simulated in-situ stress generates a lesser resolved difference and equating the in-situ stress of the subterranean formation to the identified value of simulated in-situ stress of the lesser difference; and
    utilizing the identified selected value as the in-situ stress in executing an operation regarding the subterranean formation;
    wherein the in-situ stress comprises a minimum horizontal in-situ stress;
    wherein the simulation is configured with a capacity to model: (i) porous medium deformation; (ii) pore fluid flow; (iii) fracturing fluid flow; and/or (iv) fracture propagation; and
    wherein the simulation comprises at least one of the following:
        a model of flow along a porous media according to Darcy's law;
        a model of hydraulic fracture initiation wherein coincident faces separate under a traction load;
        a model of fracturing fluid flow including longitudinal fluid flow according to Reynold's lubrication theory and Poiseuille flow; and/or
        a model of leak off flows in which a transition from Darcy flow in an undamaged state to Pouseuille flow in a damaged state varies with a parameter D having a value which ranges from 0 to 1.

2. The method of claim 1, wherein the executing an operation comprises at least one of a selection of treatment fluid pressure, selection of pump equipment and developing drill plans for other wells.

3. The method of claim 1, wherein the resolving comprises:
    if the compared portion of the simulated pressure response is less than the corresponding portion of the measured pressure response, selecting a higher value of simulated in-situ stress and repeating the running, the comparing and the identifying; and
    if the compared portion of the simulated pressure response is greater than the corresponding portion of the measured pressure response, selecting a lower value of simulated in-situ stress and repeating the running, the comparing and the identifying.

4. The method of claim 1, wherein the generating includes running the simulation of the well injection test with a multiple of different selected values of a simulated minimum horizontal in-situ stress.

5. The method of claim 1, wherein the comparing includes comparing the portions of the simulated pressure response and the measured pressure response which relate to at least one of fracture initiation and fracture propagation, respectively.

6. The method of claim 1, further comprising a simulation of a wellbore comprising a plurality one-dimensional 2-node pipe elements.

7. A method of executing an operation regarding a subterranean formation, comprising: determining an in-situ minimum horizontal stress of a formation by:

resolving a measured fracture propagation pressure from data of a well injection test conducted in a subterranean formation;

generating a simulated fracture propagation pressure by running a simulation of the well injection test with a selected value for a simulated minimum horizontal in-situ stress;

comparing the generated simulated fracture propagation pressure to the measured fracture propagation pressure;

if different, changing the selected value for a simulated in-situ minimum horizontal stress to a more convergent value and repeating the generating and comparing;

approximating the minimum horizontal in-situ stress of the subterranean formation as being the more convergent value;

utilizing the approximated minimal horizontal in-situ stress in executing an operation regarding the subterranean formation; and resolving a measured pressure fall-off segment comprising a measured instantaneous shut-in pressure and a measured fracture closure pressure from data of a well injection test conducted in a formation;

including with the simulation of the well injection test a model of the measured pressure fall-off segment;

conducting a further well injection test to resolve a second measured instantaneous shut-in pressure and running the model with the second measured instantaneous shut-in pressure to resolve a derived value for fracture closure pressure; and equating a minimum horizontal in-situ stress of the formation to the derived value for fracture closure pressure.

8. The method of claim 7, wherein the executing an operation comprises at least one of a selection of treatment fluid pressure, selection of pump equipment and developing drill plans for other wells.

9. A system operable to determine a minimum horizontal in-situ stress of a subterranean formation, comprising:

a test result component from a well injection test conducted in a subterranean formation, the test result component including pressure-fall off data and being sufficient to resolve a measured pressure response;

a simulation component configured to generate a simulated pressure response, the simulation component operable to execute a simulation of the well injection test with a selected value of a simulated minimum horizontal in-situ stress; and an arrangement to compare at least a portion of the simulated pressure response to a corresponding portion of the measured pressure response to resolve a difference;

whereby the minimum horizontal in-situ stress of the subterranean formation may be equated to a value of the simulated minimum horizontal in-situ stress corresponding with a lesser resolved difference;

wherein the system further comprises an analytical model for interpretation of pressure-fall off data of the well injection test to obtain at least one of the selected value of a simulated minimum horizontal in-situ stress;

wherein the simulation component is configured with a capacity to model: (i) porous medium deformation; (ii) pore fluid flow; (iii) fracturing fluid flow; and/or (iv) fracture propagation; and wherein the simulation component comprises at least one of the following:
 a model of flow along a porous media according to Darcy's law;
 a model of hydraulic fracture initiation wherein coincident faces separate under a traction load;
 a model of fracturing fluid flow including longitudinal fluid flow according to Reynold's lubrication theory and Poiseuille flow; and/or
 a model of leak off flows in which a transition from Darcy flow in an undamaged state to Pouseuille flow in a damaged state varies with a parameter D having a value which extends from 0 to 1.

10. The system of claim 9, wherein the simulation component further comprises a simulation of a wellbore comprising a plurality one-dimensional 2-node pipe elements.

* * * * *